US006928768B1

(12) United States Patent
Snow

(10) Patent No.: US 6,928,768 B1
(45) Date of Patent: Aug. 16, 2005

(54) DETERRENT STRIP FOR REPELLING BIRDS AND OTHER PESTS

(75) Inventor: Roger Snow, Belvedere, CA (US)

(73) Assignee: Hot Foot America LP, Belvedere, CA (US)

( * ) Notice: Subject to any disclaimer, the term of this patent is extended or adjusted under 35 U.S.C. 154(b) by 0 days.

(21) Appl. No.: 10/781,952

(22) Filed: Feb. 19, 2004

(51) Int. Cl.[7] .................... A01M 19/00; A01M 23/38
(52) U.S. Cl. .................. 43/98; 52/101; 256/10
(58) Field of Search ................. 451/526, 533; 256/10, 46; 174/27, 28; 47/32, 99, 98; 43/98, 43/112; 52/101

(56) References Cited

U.S. PATENT DOCUMENTS

| | | | | |
|---|---|---|---|---|
| 1,910,623 A | * | 5/1933 | McWilliams et al. | 43/112 |
| 2,012,384 A | * | 8/1935 | Gatti | 43/112 |
| 2,080,242 A | * | 5/1937 | Ward | 43/112 |
| 2,302,787 A | * | 11/1942 | Meehan | 43/98 |
| 2,626,303 A | | 1/1953 | Link | |
| 3,077,050 A | * | 2/1963 | Makara | 43/112 |
| 3,080,149 A | * | 3/1963 | Pilboue | 256/10 |
| 3,294,893 A | * | 12/1966 | Shaffer | 52/101 |
| 3,366,854 A | * | 1/1968 | Robinson | 43/98 |
| 3,504,892 A | * | 4/1970 | Crist | 43/112 |
| 3,531,090 A | * | 9/1970 | Laible | 256/10 |
| 3,717,802 A | * | 2/1973 | Plevy et al. | 256/10 |
| 4,262,169 A | * | 4/1981 | Lanton, Jr. | 52/101 |
| 4,299,048 A | * | 11/1981 | Bayes | 43/98 |
| 4,471,561 A | * | 9/1984 | Lapierre | 43/112 |
| 4,533,120 A | * | 8/1985 | Ruddock | 256/10 |
| 4,706,941 A | | 11/1987 | Sherdan | |
| 4,747,229 A | * | 5/1988 | Chambers | 43/112 |
| 4,862,637 A | * | 9/1989 | Dressel | 43/98 |
| 4,907,365 A | * | 3/1990 | Conigliaro, Jr. | 43/112 |
| 5,007,196 A | * | 4/1991 | Saunders et al. | 43/112 |
| 5,031,353 A | * | 7/1991 | Gardiner | 43/98 |
| 5,095,646 A | * | 3/1992 | Bunkers | 43/98 |
| 5,096,162 A | * | 3/1992 | Cleveland | 256/10 |
| 5,163,658 A | * | 11/1992 | Cleveland | 256/10 |
| 5,255,896 A | * | 10/1993 | Letarte et al. | 256/10 |
| 5,570,537 A | * | 11/1996 | Black et al. | 43/112 |
| 5,850,808 A | * | 12/1998 | Burdick | 52/101 |
| 6,006,698 A | * | 12/1999 | Negre | 52/101 |
| 6,209,853 B1 | * | 4/2001 | Roy et al. | 256/10 |
| 6,283,064 B1 | * | 9/2001 | Djukastein et al. | 43/112 |
| 6,450,483 B1 | * | 9/2002 | Baum | 256/10 |
| 2004/0200439 A1 | * | 10/2004 | Thomas et al. | 119/903 |

FOREIGN PATENT DOCUMENTS

| | | | | |
|---|---|---|---|---|
| AU | WO 90/06674 | * | 11/1989 | ............ A01K 3/00 |
| DE | 2712285 A1 | * | 9/1978 | |
| DE | 3303077 A1 | * | 8/1984 | |
| DE | 3935340 A1 | * | 10/1989 | |
| DE | 3930012 A1 | * | 3/1991 | |
| DE | 3930013 A1 | * | 3/1991 | |

(Continued)

*Primary Examiner*—Darren W. Ark
(74) *Attorney, Agent, or Firm*—Thomas R. Lampe

(57) ABSTRACT

A deterrent strip for repelling birds and other pests includes a non-conductive base supporting two electrically conductive extensible wires. Notches are formed in the base to allow bending. Connectors are attached to wire support members of the base to resist lengthwise stretching of the strip.

6 Claims, 2 Drawing Sheets

FOREIGN PATENT DOCUMENTS

| | | | | |
|---|---|---|---|---|
| DE | 10153248 A1 * | 5/2003 | | |
| EP | 1382243 A1 * | 1/2004 | | |
| FR | 2550409 A1 * | 2/1985 | ............ | A01K 3/00 |
| FR | 2684271 A1 * | 6/1993 | | |
| FR | 2712452 A1 * | 5/1995 | | |
| GB | 1604155 A1 * | 12/1981 | | |
| GB | 2300101 A1 * | 10/1996 | | |
| GB | 2347336 A1 * | 9/2000 | | |
| IT | 495915 B1 * | 6/1954 | .................... | 43/98 |
| SE | 135179 B1 * | 4/1952 | .................... | 43/98 |
| WO | WO-96/07312 A1 * | 3/1996 | | |
| WO | WO-2004/021780 A1 * | 3/2004 | | |

* cited by examiner

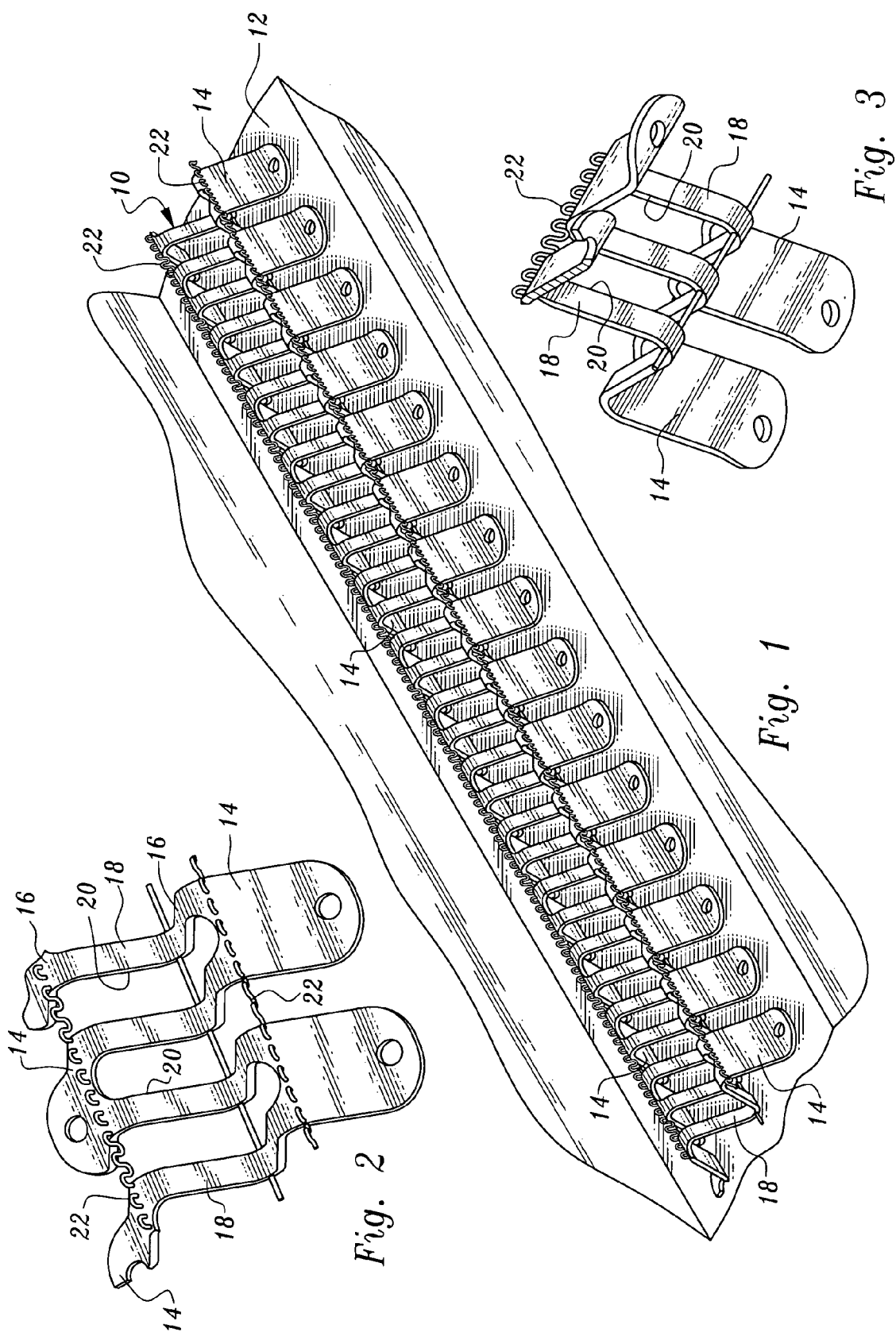

US 6,928,768 B1

DETERRENT STRIP FOR REPELLING BIRDS AND OTHER PESTS

TECHNICAL FIELD

This invention relates to a pest repelling device, and more particularly to a strip which may be secured to buildings, statues or other objects to discourage birds and other pests from resting thereon.

BACKGROUND OF THE INVENTION

U.S. Pat. No. 6,383,064, issued Sep. 4, 2001, discloses a pest repelling device co-invented by the inventor of the present invention.

The device of U.S. Pat. No. 6,383,064 relates to an elongated deterrent strip for mounting to an inanimate object to discourage birds and other pests from resting on that object. The strip includes a base of electrically non-conductive material. The strip in lateral cross-section has peripheral edges normally lying in a plane and a raised concave center portion. The base has spaced notches along each edge to provide flexibility to the base, whereby the base may be bent both out of the plane and within the plane. The strip further comprises two electrically conductive wires secured to and extending over the upper surface of the base, over the notches. The wires are spaced so that a bird's feet will contact both wires when on the base. The wires are connectable to an energy source so that the animal's feet will short the wires when perched on the strip, giving a mild shock to the animal to discourage it from continuing its perch on the strip.

In the device of U.S. Pat. No. 6,383,064, the wires are crimped in undulating fashion along the length of the base. One problem resulting from this prior art approach is that strong winds can cause the strip to flap up and down. This causes lengthwise stretching of the strip, including the undulating wires, and the end result is that the product either bends upwardly into an arch or in certain circumstances stretches so far that it sags over the edge of the building or other support surface on which it is mounted. In an attempt to solve the problem the strip has been attached to its support surface along the length thereof at very short intervals, e.g., 12 inches. However, even this does not eliminate the stretching problem.

Other devices are known in the prior art for carrying electric charges for discouraging birds and other pests. Exemplary of the state of the prior art are the devices shown in the following: U.S. Pat. No. 5,850,808, issued Dec. 22, 1998, U.S. Pat. No. 3,294,893, issued Dec. 27, 1966, U.S. Pat. No. 3,717,802, issued Feb. 20, 1973, U.S. Pat. No. 3,366,854, issued Jan. 30, 1968, U.S. Pat. No. 4,299,048, issued Nov. 10, 1981, U.S. Pat. No. 4,706,941, issued Nov. 17, 1987, U.S. Pat. No. 5,163,658, issued Nov. 17, 1992, U.S. Pat. No. 5,096,162, issued Mar. 17, 1992 and U.S. Pat. No. 2,626,303, issued Jan. 20, 1953.

The prior art indicated above does not teach or suggest the invention disclosed and claimed herein.

DISCLOSURE OF INVENTION

The present invention relates to a deterrent strip for repelling birds and other pests. The strip includes a plurality of wire support members of electrically non-conductive material forming a bendable base. Each wire support member includes two spaced wire support portions and an inner portion disposed between and interconnecting the spaced wire support portions. The inner portions of adjacent wire support members define spaces therebetween.

The deterrent strip also includes two electrically conductive, extensible wires disposed along at least a portion of the length of the base. The electrically conductive, extensible wires are secured to the spaced wire support portions and spaced from one another.

Restraint members are attached to and extend between the inner portions of adjacent wire support members across the spaces defined thereby resisting lengthwise stretching of the strip.

Other features, advantages and objects of the present invention will become apparent with reference to the following description and accompanying drawings.

BRIEF DESCRIPTION OF DRAWINGS

FIG. 1 is a perspective view of a portion of a strip constructed in accordance with the teachings of the present invention mounted on a support surface;

FIG. 2 is an enlarged, top, perspective view illustrating details of a segment of the strip, including wire support members, two electrically conductive extensible wires and restraint members associated with the wire support members;

FIG. 3 is an enlarged, bottom, perspective view of the components illustrated in FIG. 2;

MODES FOR CARRYING OUT THE INVENTION

Figure 4:
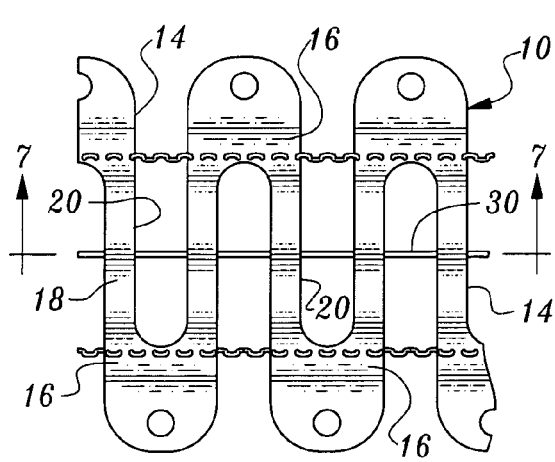
FIG. 4 is a top, plan view of a segment of the strip.
Figure 5:
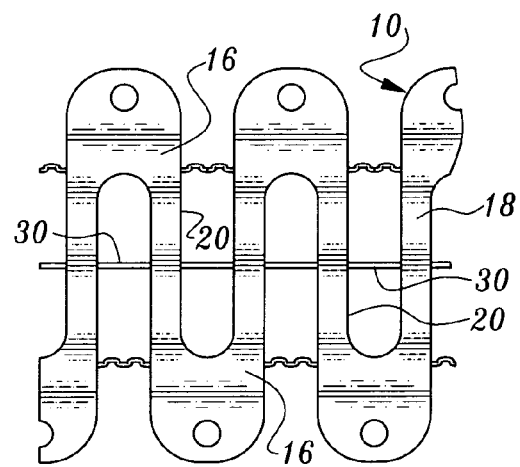
FIG. 5 is a bottom, plan view of the segment shown in FIG. 4.
Figure 6:
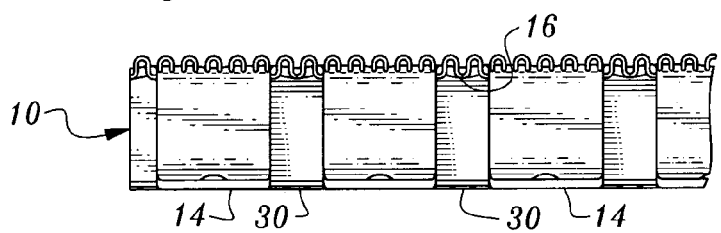
FIG. 6 is a frontal, elevational view of a segment of the strip.

Referring now to FIGS. 1–7, a strip 10 constructed in accordance with the teachings of the present invention is illustrated. The strip 10 is a deterrent strip for repelling birds and other pests. In FIG. 1, a length of the strip 10 is shown mounted on the ledge 12 of a building, a typical but not exclusive setting for use of the strip.

The strip includes a flexible, bendable base which is comprised of a plurality of wire support members 14 of electrically non-conductive material, for example plastic. Each wire support member includes two spaced wire support portions 16 and an inner portion 18 extending downwardly therefrom. The inner portions of adjacent wire support members define spaces 20 therebetween.

In the arrangement illustrated, the wire support members 14 are integrally connected. The base comprised of the wire support members has side edges and the spaces 20 defined by the inner portions of the wire support members are in the form of notches extending inwardly from the side edges in alternating fashion. The notches or spaces provide flexibility to the base whereby it may be bent both out of plane and within plane.

Strip 10 also includes two electrically conductive wires 22 which are crimped so that they are somewhat extensible to enable the strip to be bent as desired to conform to the shape of the support to which it is secured. This is accomplished by forming the wires so that they undulate lengthwise. The wires may be embedded into the wire support members or secured thereto in some other fashion. When the strip is bent, the undulating configuration of the wires provides them with a certain amount of give so that they will not disassociate from the base when it is bent or when the wires and base expand or contract at a different rate. The spacing between the wires is such that they can be simultaneously engaged by a pest, such as by the feet of a bird. The wires are connected to a source of electrical energy (not shown) and impart a mild shock to the animal so that it moves away from the strip.

The structure described above is essentially disclosed in the above referenced U.S. Pat. No. 6,283,064 and such an arrangement is subject to undesirable lengthwise stretching after installation, also as described above.

To solve the problem of stretching, in the present invention restraint members are attached to and extend between the inner portions of adjacent wire support members across the spaces defined thereby to resist lengthwise stretching of the strip. More particularly, the restraint members are in the form of flexible, readily bendable, substantially non-linearly extensible connectors 30. In the FIGS. 1–7 embodiment, the connectors 30 are integral with the wire support members and the connectors and the wire support members are of a single, unitary molded plastic construction. The nature of the connectors 30 is such that they enable the strip to be bent while exerting forces on the wire support members thereof which limit lengthwise stretching of the strip.

Figure 7:
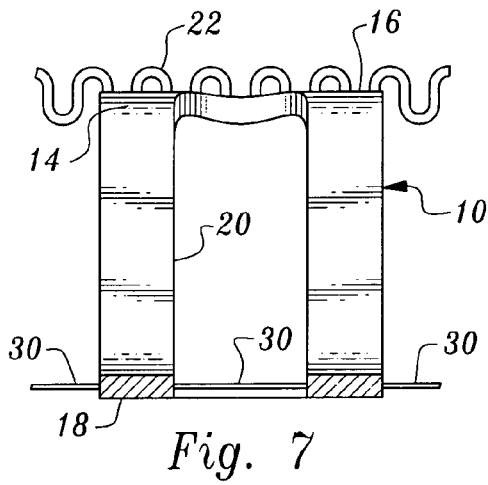
FIG. 7 is a greatly enlarged, cross-sectional view of selected components of the strip as taken along line 7—7 of FIG. 4.
Figure 8:
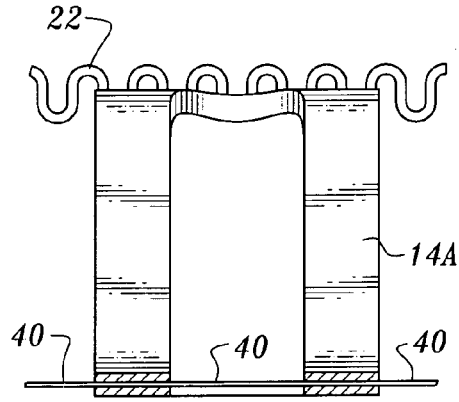
FIG. 8 is a view similar to FIG. 7, but illustrating an alternative embodiment of the invention.

FIG. 8 is a view similar to FIG. 7, but illustrating an alternative embodiment wherein the connectors 40 are segments of a single elongated connector member extending through and projecting from opposed ends of the wire support members 14A. The connectors may be affixed to the wire support members 14A by any suitable means such as adhesive or heat bonding.

Figure 9:
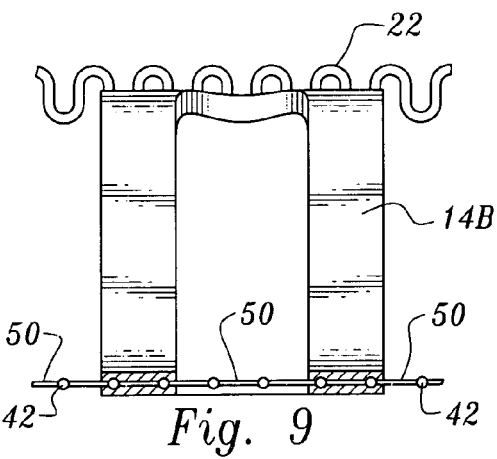
FIG. 9 is a view similar to FIGS. 7 and 8, but illustrating a third embodiment of the invention.

FIG. 9 shows another embodiment wherein the connectors 50 also comprise segments of a single elongated connector member extending through and projecting from opposed sides of the wire support members 14B. In this instance, attachment to the wire support members 14B is accomplished by enlargements 42 spaced along the single elongated connector member seated in corresponding cavities formed in the wire support members 14B.

What is claimed is:

1. A deterrent strip positionable on a support for repelling birds and other pests, said strip comprising, in combination:
   a plurality of wire support members of electrically non-conductive material forming an elongated, flexible, bendable base having side edges, each wire support member including two spaced wire support portions and an inner portion disposed between and interconnecting the spaced wire support portions, said wire support portions of each wire support member being elevated relative to the inner portion thereof, adjacent wire support members defining spaces therebetween extending inwardly from at least one of said side edges;
   first and second electrically conductive, undulating, crimped, extensible wires disposed along at least a portion of the length of said base, said first electrically conductive, undulating, crimped, extensible wire secured to one of said spaced wire support portions and said second electrically conductive, undulating, crimped, extensible wire secured to the other of said spaced wire support portions, said first and second electrically conductive, undulating, crimped, extensible wires being parallel and spaced from one another a distance enabling a bird or other pest to simultaneously contact said first and second electrically conductive, undulating, crimped, extensible wires when engaging the strip to short said electrically conductive, undulating, crimped, extensible wires and provide a mild shock to the pest; and
   restraint members spaced inwardly from the side edges of said elongated, flexible, bendable base and attached to and extending between adjacent wire support members across the spaces defined thereby resisting lengthwise stretching of said strip and limiting stretching of said electrically conductive, undulating, crimped, extensible wires while allowing the elongated, flexible, bendable base to bend both out of plane and within plane to conform to the shape of the support.

2. The strip according to claim 1 wherein said wire support members are integrally connected and wherein the spaces defined by the wire support members comprise notches.

3. The strip according to claim 1 wherein said resistant members comprise flexible, readily bendable, substantially non-linearly extensible connectors.

4. The strip according to claim 3 wherein said connectors are integral with said wire support members.

5. The strip according to claim 4 wherein said connectors and said wire support members are of a molded plastic construction.

6. The strip according to claim 3 wherein said connectors comprise segments of a single elongated connector member extending through and projecting from opposed ends of said wire support members and attached to said wire support members.

* * * * *